Aug. 3, 1965 W. J. CHENEY 3,199,093

ERASURE PREVENTION CONTROL FOR MAGNETIC TAPE RECORDER

Filed June 29, 1962 2 Sheets-Sheet 1

WALTER J. CHENEY
INVENTOR.

BY Robert G. Clay

ATTORNEY

Aug. 3, 1965 W. J. CHENEY 3,199,093

ERASURE PREVENTION CONTROL FOR MAGNETIC TAPE RECORDER

Filed June 29, 1962 2 Sheets-Sheet 2

WALTER J. CHENEY
INVENTOR.

BY Robert G. Clay

ATTORNEY 3,199,093
Patented Aug. 3, 1965

3,199,093
ERASURE PREVENTION CONTROL FOR MAGNETIC TAPE RECORDER

Walter J. Cheney, San Mateo, Calif., assignor to Ampex Corporation, Redwood City, Calif., a corporation of California Filed June 29, 1962, Ser. No. 206,513
13 Claims. (Cl. 340—174.1)

This invention relates to magnetic tape recorders and particularly to control mechanisms therefor.

When valuable information has been recorded on a magnetic tape, it is often desirable to take special precautions to prevent the tape from being inadvertently erased so as to cause loss of the original information.

Previously this end has been partly accomplished by providing visible warning markers for the tape storage reel to indicate to an operator that the tape bears information that must be preserved. Such markers, however, do not provide certainty in operation because they can be inadvertently ignored. Another solution has been to provide a mechanical interruption of the erasing circuits, controlled by means that must be applied to, or removed from, the tape storage or supply reel to render the circuits operative. Such apparatus, though it is more satisfactory than the visual markers in operation, has been characterized by excessively complicated electronic circuits, or by mechanical couplings that are subject to wear, malfunction and eventual failure.

It is therefore an object of the present invention to provide for controlling a magnetic tape machine to positively prevent erasure of a recorded tape applied thereto, such apparatus being substantially free of the danger of malfunction and failure, and being of improved simplicity and economy both in manufacture and operation.

It is another object of the invention to provide apparatus as above described and characterized by the absence of frictional contact between moving parts.

It is still another object of the present invention to provide apparatus as above described and characterized by the absence of electronic circuit elements that are subject to deterioration and failure.

It is still a further object of the invention to provide apparatus as above described that may be manufactured with a minimum of parts, all of the simplest and least expensive types.

A typical apparatus constructed in accordance with the invention includes an electric switch of the "magnetic reed" type that is directly affected by magnetic fields in such a way that the switch is open when the magnetic flux linked therewith is below a certain value, and is closed when the flux exceeds this value. The switch mounted near the supply reel of the recording machine and is coupled into the erasing circuits of the machine so as to prevent erasure when the switch is open (or closed). A permanent magnet is mounted near the switch in such a way that the field thereof normally maintains the switch closed (or open); and a mu-metal ring is provided for attachment to the tape reel to alter the flux distribution of the field so as to cause the switch to open (or close). Thus the machine may be prevented from erasing either when the ring is mounted on the reel to indicate that the tape already has information recorded thereon, or alternatively when the ring is removed to indicate the same state of affairs.

Further objects and advantages together with a better understanding of the invention may be had by reference to the following description, taken in conjunction with the accompanying drawings, in which.

Figure 1:
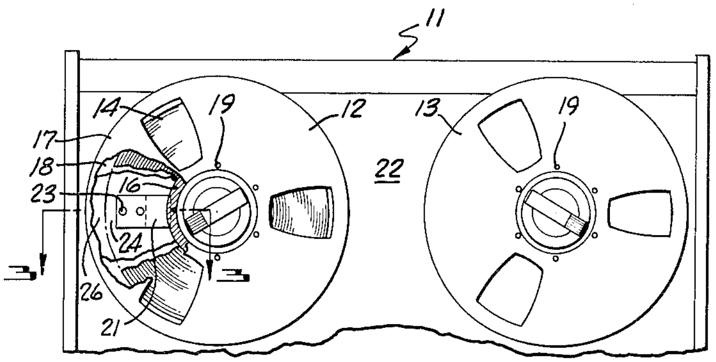
FIGURE 1 is an elevation view of a typical magnetic tape transport, broken away to show a portion of the invention.
Figure 2:
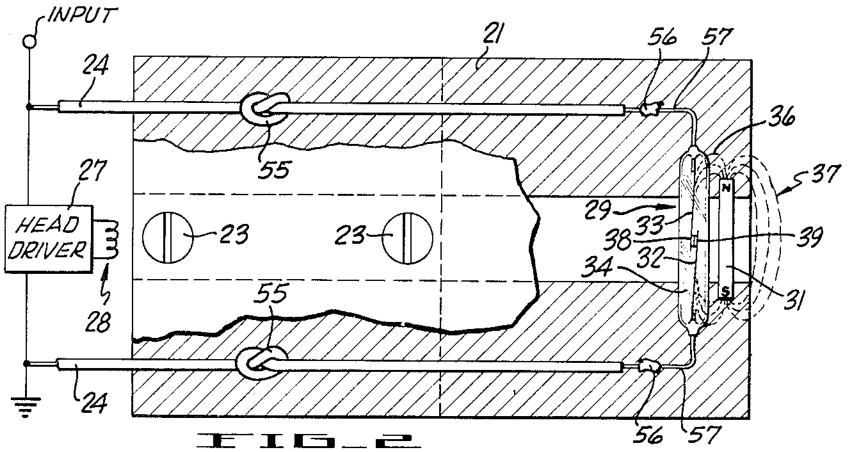
FIGURE 2 is an enlarged, broken-away and partly schematic elevation of a portion of the invention shown in FIGURE 1.

Referring now to FIGURE 1, there is shown a tape transport 11 mounting a pair of supply and takeup reels 12 and 13. The transducing heads, tape guides, and other standard portions of the transport are not shown in this view for purposes of simplification. A tape 14 is shown fully coiled on the supply reel 12 as if the loaded reel had just been placed on the transport. The reel has a hub 16 and two side flanges 17 and 18 secured to the hub, as by fasteners 19. Beneath the reel is a plastic block 21, into which is cast or molded certain apparatus of the invention described below. The block 21 is mounted on the top plate 22 of the machine as by fasteners 23. A pair of electrical leads 24 extend from the block and through an opening 26 in the top plate. As shown in FIGURE 2, the leads 24 are connected in parallel with a head driver 27, to which is coupled an erasing head 28. To complete the circuit between leads 24, they are connected to a switch 29, which is magnetically biased to a closed position as by a permanent magnet 31, mounted beside the switch within the plastic block 21. It will be understood that when the switch is closed, the head driver 27 is short-circuited and the head 28 cannot be energized.

The switch 29 is of a type that has a pair of magnetically permeable contact arms 32 and 33 enclosed within an evacuated glass tube 34. The arms 32–33 are somewhat springy and are in the open condition as they are originally manufactured. However, for purposes of this disclosure, the "normal" position of the arms is defined as that shown in FIGURE 2, wherein they are biased by the magnet 31 to a closed position. Thus, the arms are herein termed "normally-closed."

The magnet 31 is here shown as parallel to the arms 32–33, which in turn are arranged in series substantially on a common axis, so that a portion 36 of the field flux 37 of the magnet is linked with the two arms, causing the contacts 38 and 39 thereof to have opposite polarities and to be attracted together to close the switch.

Figure 3:
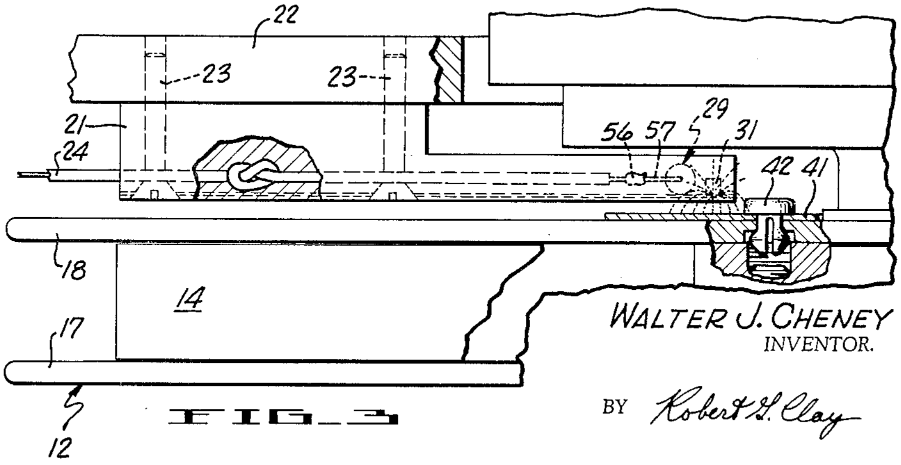
FIGURE 3 is an enlarged cross-sectional plan, taken substantially on the plane of lines 3—3 of FIGURE 1, of a portion of the apparatus with a further portion of the invention in place.
Figure 4:
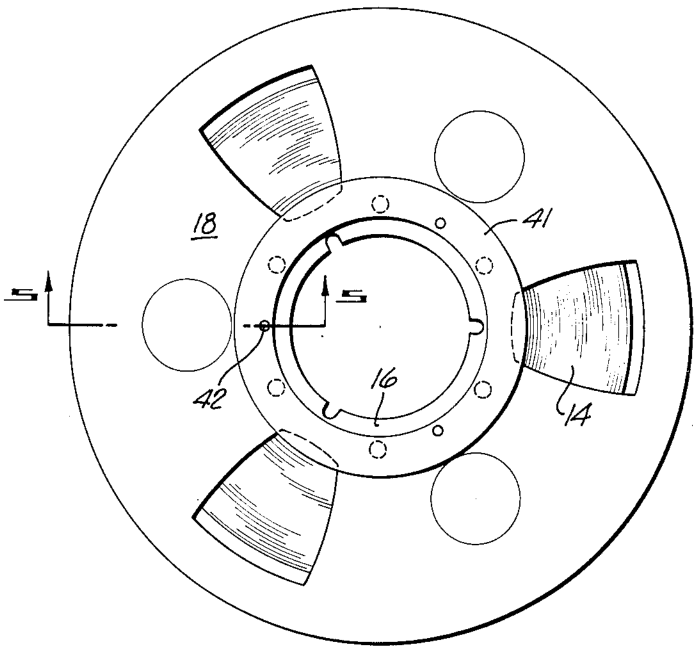
FIGURE 4 is an enlarged back elevation of a portion of the apparatus shown in FIGURE 1, with a further portion of the invention in place.

To arm the reel 12 in such a way that the record head 28 will record, the operator secures to the reel a ring 41 (FIGURES 3–5) made of highly permeable material such as mu-metal. The ring is secured as by a number of clips 42 fitting through openings in the ring and side flange 18 of the reel. Once in place, as shown in FIGURE 3, on the side of the reel facing the magnet 31, a portion of the ring 41 covers and is very closely spaced from the magnet. Thus, some portion of the ring 41 is always near the magnet in whatever rotational position the reel occupies.

As schematically shown in FIGURE 3, the effect of the mu-metal ring is to establish a low-reluctance path for the flux of magnet 31, so that in effect the flux density of that portion of the field remaining linked with the switch arms 32–33 is lessened, causing the arms to open.

Figure 5:
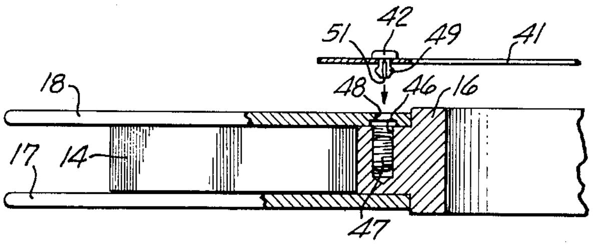
FIGURE 5 is an enlarged, partly exploded cross-section, taken substantially on the plane of lines 5—5 of FIGURE 4.

In FIGURE 5 there is shown a further detail of the arrangement for securing the ring. If desired, the openings in the reel can be blocked in such a way as to make it impossible to secure the ring. For example, a threaded bore 46 extends deep into the hub 16 and entirely contains a set screw 47. The latter is retained in the bore 46 by means of the flange 18, for the opening 48 in the flange is stepped or tapered to be less than the diameter of the bore 46 at the outer and smaller portion of the opening. The clip 42 has an enlarged end 49 and a central slot 51 so that it can be snap-fitted in the tapered opening 48 or withdrawn therefrom. However, when it is desired to prevent insertion of the clip 42, the set screw 47 may be backed to the upper end of the bore 46, and left in this position. Such an arrangement provides extra security against accidental erasure in the above described device.

Figures 6, 7:
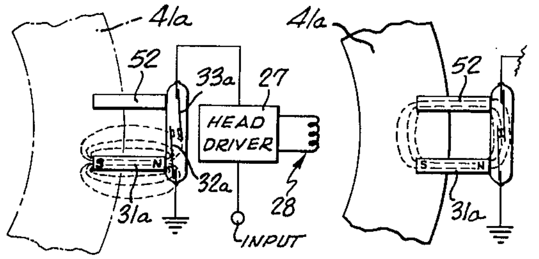
FIGURE 6 is a schematic view of a modified version of the invention.
FIGURE 7 is a further schematic view of the modified version shown in FIGURE 6.

An alternative arrangement is illustrated in FIGURES 6 and 7. In this arrangment, the magnet 31*a* is perpendicular to and adjacent one switch arm 32*a*, while in parallel with the magnet and adjacent the other switch arm 33*a* is positioned a bar 52 of permeable material that is not permanently magnetizable such as mu-metal. Ordinarily therefore the field of magnet 31*a* is coupled mainly with arm 32*a* and only very slightly with arm 33*a* and bar 52, so that the switch remains open and is termed "normally-open." This so-called normal condition, however, in this version of the invention, occurs only while the tape has a recording thereon and it is desired not to erase this recording. When erasing is not objectionable, e.g. when the tape is blank, the reel bears the ring 41*a*, and when the tape is recorded, the ring is removed from the reel. In the erasing-recording position (FIGURE 7), the ring completes a magnetic circuit extending from the magnet, through both switch leaves, and the permeable bar 52 in such a way as to cause a flux of greater density to be coupled with both of the arms 33*a* and 32*a*, with the result that they become oppositely polarized and are closed. The switch is connected in series with the head driver 27 in this arrangement.

It is noted that the block 21 may be formed of any electrically insulating material, and that the leads 24 have knots 55 formed therein to provide structural anchoring in the material of the block. The leads are coupled by means of soldered joints 56 to the leads 57 of the switch 29 (see FIGURE 2).

It is also noted that in both verisons of the inventive structure (FIGURES 1–3 and FIGURES 6–7), the spacing of the magnet from the switch, the spacing of the ring from the magnet, the strength of the magnet, the mechanical strength of the switch (i.e. its tendency to remain open), and the magnetic permeabilities of the switch arms, the ring and the bar 52, are all interdependent parameters. The values of these parameters may be selected within wide ranges and in varying combinations, so long as the combination selected provides the action described. However under some circumstances there may be an important limiting parameter, in that the strength of the magnet and its spacing from the tape 14 must be such that the magnetic field strength at the tape does not provide a significant magnetizing or erasing effect on the tape. In either of the two versions, however, the structure described lends itself to the use of a very low-strength magnet, partly because the switch 29 is extremely sensitive and is satisfactorily operated with such a magnet. This structure in fact provides one of the chief advantages of the invention, in that even though a low-strength magnet is used, the operation of the switch is effected directly thereby, and without the need for intervening electronic circuitry, amplifiers, or other elements such as have been needed heretofore in the art.

In operation (FIGURES 1–3), the tape on reel 12 is first recorded with the ring 41 mounted on the reel. As soon as the recording is completed (even before rewinding if desired), the ring 41 is detached from the reel. Thereafter, whenever the reel is on the machine without the ring, the magnet field strength operating on the switch is great enough to maintain the switch in closed position. The switch 29 is therefore closed and erasure is automatically prevented. Playback and other desirable operations are not inhibited, however.

In the operation of the version of FIGURES 6–7, the attachment of the ring to the reel has the same meaning, i.e., that the tape is blank or may be recorded upon. Therefore, when it is desired to record, the ring is left on the reel, so as to complete the magnetic circuit through the magnet, the two switch arms, and the bar 52, thus closing the switch. When the recording is completed, the ring is removed, and the set-screws 47 may be backed in their bores 46 to positively prevent subsequent attachment of the ring. Thereafter, when the reel is on the machine, the magnet maintains the switch in open position, and erasure is prevented, although other desirable operations are permitted.

It is clear that the magnetic circuit of FIGURES 2–3 may be used with the electrical circuit of FIGURES 6–7, or that the magnetic circuit of FIGURES 5–6 may be used with the electrical circuit of FIGURES 2–3, to provide a device in which the mounting of the ring on the reel prevents erasure instead of permitting such action. It is also clear that the switch in any arrangement may be coupled to a subsidiary circuit to provide an opposite end effect. Furthermore, it should be understood that the invention may be used as described to control the operation of a record head as well as an erase head, to prevent loss of recorded information as by inadvertent re-recording.

Thus there has been described a control mechanism for a magnetic tape machine, comprising: a magnetically operable electric switch mounted on the machine near the position of the supply reel, a magnet mounted near the switch for biasing the switch to a predetermined operating position either preventing or permitting erasure of the tape, and means including at least a mu-metal ring attachable to the reel for altering the flux distribution of the magnet so as to operate the switch to its other position.

What is claimed is:

1. A control mechanism for a magnetic tape machine of the type that is provided with a tape supply reel, comprising:

a magnetic reed switch mounted on said machine adjacent to said reel, said switch being operable between open and closed positions and including means urging said switch toward one of said positions;

means mounted on said machine adjacent to said switch for magnetically biasing said switch to the other of said positions; and means detachably mounted on said reel for altering said field at said switch for operation to said one position under the urging of said first-named means.

2. A control mechanism for a magnetic tape machine of the type that is provided with a tape supply reel, comprising:

an electric switch mounted on said machine adjacent the position of said reel, said switch having contacts that are directly affected by magnetic fields so as to be in an open position when the magnetic flux that is linked with said contacts has a first predetermined character, and so as to be in a closed position when said flux has a second predetermined character;

means mounted on said machine adjacent the position of said reel for establishing a magnetic field in which a portion of the flux is linked with said contacts and has one of said predetermined characters; and means detachably mounted on said reel for functioning in all rotational positions thereof to alter said field and to cause said linked flux to have the other of said predetermined characters;

whereby the operating mode of said switch may be established for the entire time said reel is on said machine, as by manually detaching said last-named means to said reel, or removing it therefrom, prior to assembling said reel on said machine.

3. A control mechanism for a magnetic tape machine of the type that is provided with a tape supply reel, comprising:

an electric switch mounted on said machine adjacent the position of said reel, said switch having contacts that are directly affected by magnetic fields so as to be in an open position when the magnetic flux that is linked with said contacts has a first predetermined character, and so as to be in a closed position when said flux has a second predetermined character;

means mounted on said machine adjacent the position of said reel for establishing a magnetic field in which a portion of the flux is linked with said contacts and has one of said predetermined characters;

means detachably mounted on said reel for functioning in all rotational positions thereof to alter said field and to cause said linked flux to have the other of said predetermined characters; and means including an electrical circuit coupled to said switch for controlling the operation of said machine in accordance with the position of said switch.

4. A control mechanism for a magnetic tape machine of the type that is provided with a tape supply reel, comprising:

an electric switch mounted on said machine adjacent the position of said reel, said switch having contacts that are directly affected by magnetic fields so as to be in an open position when the magnetic flux that is linked with said contacts has a first predetermined density, and so as to be in a closed position when said flux has a second and substantially greater predetermined density;

means mounted on said machine adjacent the position of said reel for establishing a magnetic field a portion of which has said predetermined second flux density and is linked with said contacts, whereby said contacts are normally closed; and means detachably mounted on said reel for functioning in all rotational positions thereof to alter the flux distribution of said field and to cause said linked portion thereof to have said predetermined first and lesser flux density, whereby said contacts are opened;

whereby the operating mode of said switch may be established for the entire time said reel is on said machine, as by manually attaching said last-named means to said reel, or removing it therefrom, prior to assembling said reel on said machine.

5. A control mechanism for a magnetic tape machine of the type that is provided with a tape supply reel, comprising:

an electric switch mounted on said machine adjacent the position of said reel, said switch having contacts that are directly affected by magnetic fields so as to be in an open position when the magnetic flux that is linked with said contacts has a first predetermined density, and so as to be in a closed position when said flux has a second and substantially greater predetermined density;

a magnet mounted on said machine adjacent the position of said reel for establishing a magnetic field a portion of which has said predetermined second flux density and is linked with said contacts, whereby said contacts are normally closed; and a magnetically permeable element detachably mounted on said reel for functioning in all rotational positions thereof to alter the flux distribution of said field and to thereby cause said linked portion thereof to have said predetermined first and lesser flux density, whereby said contacts are opened;

whereby the operating mode of said switch may be established for the entire time said reel is on said machine, as by manually attaching said last-named means to said reel, or removing it therefrom, prior to assembling said reel on said machine.

6. A control mechanism for a magnetic tape machine of the type that is provided with a tape supply reel and a recording head and energizing means therefor, comprising:

an electric switch mounted on said machine adjacent the position of said reel, said switch having a pair of contact arms aligned in series generally on a common axis, said arms being directly affected by magnetic fields so as to be in an open position when the magnetic flux that is linked with said arms has a first predetermined value of density, and so as to be in a closed position when said flux has a second and substantially greater predetermined density;

a bar magnet mounted on said machine adjacent the position of said switch and generally parallel to said axis for establishing a magnetic field a portion of which has said predetermined second flux density and is linked with said contacts, whereby said contacts are normally closed; and a magnetically permeable ring shaped element detachably and concentrically mounted on said reel for functioning in all rotational positions thereof to be permeated by said magnetic field and to thereby decrease said linked flux density to said predetermined first and lesser value, whereby said contacts are opened;

whereby the operating mode of said switch may be established for the entire time said reel is on said machine, as by manually attaching said last-named means to said reel, or removing it therefrom, prior to assembling said reel on said machine.

7. A control mechanism as characterized in claim 6, wherein: said switch is connected in parallel with said recording head so that said head can be energized only while said last-named means is on said reel and said reel is on said machine, whereby accidental recording or re-recording on said tape is prevented.

8. A control mechanism for a magnetic tape machine of the type that is provided with a tape supply reel, comprising:

an electric switch mounted on said machine adjacent the position of said reel, said switch having contacts that are directly affected by magnetic fields so as to be in an open position when the magnetic flux that is linked with said contacts has a first predetermined density, and so as to be in a closed position when said flux has a second and substantially greater predetermined density;

means mounted on said machine adjacent the position of said reel for establishing a magnetic field a portion of which has said predetermined first flux density and is linked with said contacts, whereby said contacts are normally open; and means at least a portion of which is detachably mountable on said reel for functioning in all rotational positions thereof to alter the flux distribution of said field and to cause said linked portion of said field to have said predetermined second and greater flux density, whereby said contacts are closed;

whereby the operating mode of said switch may be established for the entire time said reel is on said machine, as by manually attaching said detachably-mountable portion of said last-named means to said reel, or removing it therefrom, prior to assembling said reel on said machine.

9. A control mechanism for a magnetic tape machine of the type that is provided with a tape supply reel, comprising:

an electric switch mounted on said machine adjacent the position of said reel, said switch having contacts that are directly affected by magnetic fields so as to be in an open position when the magnetic flux that is linked with said contacts has a first predetermined density, and so as to be in a closed position when said flux has a second and substantially greater predetermined density;

a magnet mounted on said machine adjacent the position of said reel for establishing a magnetic field a portion of which has said predetermined first flux density and is linked with said contacts, whereby said contacts are normally open; and means including a first magnetically permeable element mounted on said machine adjacent said switch and magnet and a second magnetically permeable element detachably mountable on said reel for functioning in all rotational positions thereof to complete a magnetic circuit and to thereby alter the flux distribution of said field so as to cause said linked portion of said field to have said predetermined second and greater flux density, whereby said contacts are closed;

whereby the operating mode of said switch may be established for the entire time said reel is on said machine, as by manually attaching said last-named means to said reel, or removing it therefrom, prior to assembling said reel on said machine.

10. A control mechanism for a magnetic tape machine of the type that is provided with a tape supply reel and a recording head and energizing means therefor, comprising:

an electric switch mounted on said machine adjacent the position of said reel, said switch having a pair of contact arms aligned in series generally on a common axis, said arms being directly affected by magnetic fields so as to be in an open position when the magnetic flux that is linked with said arms has a first predetermined density, and so as to be in a closed position when said flux has a second and substantially greater predetermined density;

a bar magnet mounted on said machine adjacent the position of one of said switch arms and generally perpendicular to said axis for establishing a magnetic field a portion of which has said predetermined first density and is linked with said arms, whereby said contacts are normally open; and means including a magnetically permeable bar element mounted on said machine adjacent the other of said switch arms and parallel to the substantially spaced from said magnet so as to define with said magnet and switch arms an incomplete substantially U-shaped magnetic circuit;

said last-named means also including a magnetically permeable ring-shaped element detachably and concentrically mountable on said reel for functioning in all rotational positions thereof to complete said magnetic circuit and to thereby alter the flux distribution of said field so as to cause said portion of said field that is linked with said switch arms to have said predetermined second and greater flux density, whereby said contacts are closed;

whereby the operating mode of said switch may be established for the entire time said reel is on said machine, as by manually attaching said last-named means to said reel, or removing it therefrom, prior to assembling said reel on said machine.

11. A control mechanism as characterized in claim 10, wherein: said switch is connected in series with said recording head and energizing circuit so that said head cannot be energized unless said last-named means is on said reel and said reel is on said machine, whereby accidental recording or rerecording on said tape is prevented.

12. A mechanism as characterized in claim 10, and also including means on said reel for positively preventing attachment of said ring-shaped element thereto when erasure or recording of said tape is not desired.

13. A control mechanism for a magnetic tape machine of the type that is provided with a tape supply reel, comprising:

a magnetic reed switch mounted on said machine adjacent to said reel, said switch being operable between open and closed positions and including means urging said switch toward one of said positions;

means mounted on said machine adjacent to said switch for magnetically biasing said switch to the other of said positions;

said reel including a hub member having a plurality of threaded bores formed therein in spaced relation about the axis of said hub member and aligned parallel to the axis of said hub member, a plurality of set-screws threaded into said bores deeply enough to leave a substantial space between the heads of said set-screws and the orifices of the respective bores, a flange member coaxially secured to an end face of said hub and covering the orifices of said bores, said flange having a plurality of openings formed therein and registering with said orifices of said bores, the inner orifices of said openings being at least as large as the respective orifices of said bores, and the outer orifices being substantially smaller than the orifices of said bores; and means detachably mounted on said reel for altering said field at said switch for operation to said one position under the urging of said first-named means;

said means detachably mounted on said reel including a ring member overlying said outer orifices of said openings, and a plurality of spring clips extending from said ring member into said openings, said clips having resiliently compressible enlarged ends for snap-fitting into said openings and for mounting said ring member on said reel;

whereby when said ring member is removed, said set-screws may be backed in said bores to prevent the insertion of said clips and the attachment of said ring.

References Cited by the Examiner

UNITED STATES PATENTS

| | | | |
|---|---|---|---|
| 2,466,514 | 4/49 | Vagtborg | 179—100.2 |
| 2,612,565 | 9/52 | Heller | 179—100.2 |
| 2,973,159 | 2/61 | Kulka | 242—71.8 |
| 2,992,789 | 7/61 | Sardeson | 242—71.8 |

IRVING L. SRAGOW, *Primary Examiner.*